United States Patent [19]
Krueger

[11] Patent Number: 5,507,362
[45] Date of Patent: Apr. 16, 1996

[54] TREE STAND TORSO BAR

[76] Inventor: Wayne C. Krueger, 18242 Tulane St., Forest Lake, Minn. 55025

[21] Appl. No.: 388,997

[22] Filed: Feb. 15, 1995

[51] Int. Cl.[6] .................................................. A62B 35/00
[52] U.S. Cl. ........................................... 182/3; 182/187
[58] Field of Search ................................ 182/187, 188, 182/3; 248/231, 219.4

[56] References Cited

U.S. PATENT DOCUMENTS

| | | | |
|---|---|---|---|
| 3,358,789 | 12/1967 | Laun | 182/187 X |
| 4,236,602 | 12/1980 | Leggett | 182/187 |
| 4,331,216 | 5/1982 | Amacker | 182/135 |
| 4,951,778 | 8/1990 | Halvorson | 182/9 |
| 4,969,538 | 11/1990 | Amacker | 182/187 |
| 4,987,972 | 11/1991 | Helms | 182/187 |
| 5,090,505 | 2/1992 | Amacker | 182/187 |
| 5,103,935 | 4/1992 | Amacker | 182/187 |
| 5,234,076 | 8/1994 | Louk et al. | 182/187 |
| 5,310,019 | 5/1994 | Paul | 182/187 |
| 5,316,104 | 3/1994 | Amacker | 182/187 |
| 5,398,779 | 3/1995 | Meyer | 182/187 |

*Primary Examiner*—Alvin C. Chin-Shue
*Attorney, Agent, or Firm*—Palmatier, Sjoquist & Helget

[57] ABSTRACT

A tree stand torso bar is attachable to a tree or post to support the torso of a hunter in a tree stand and prevent the hunter from accidentally falling out of the stand. The invention comprises a sturdy oval metal frame with vertical supports which engage the trunk of the tree, a lower cross-bar connecting the vertical supports, lower inclining struts which provide additional strength, and an adjustable strap which may be tightened by a ratchet mechanism to hold the device to the tree trunk or pole. The frame, supports, cross-bar, and struts are of integral, unitary construction. The device may be screwed into the tree by threaded stakes directed through apertures in the vertical supports. Alternatively, a second strap may be used in place of the threaded stakes.

20 Claims, 2 Drawing Sheets

TREE STAND TORSO BAR

BACKGROUND OF THE INVENTION

This invention relates to a torso bar to be used in conjunction with a tree stand to support the torso of a hunter in the tree stand and prevent the hunter from accidentally falling off the stand.

Hunters who utilize tree stands or platforms above the ground to aid in hunting have long been hampered by the unavailability of an effective restraining device that is readily available, easy to use, relatively inexpensive, sturdy, safe and comfortable to the user. This need has been particularly acute for those using tree stands, where the nature of the stand hinders the hunter's free movement due to apprehension of heights and the possibility of accidentally falling from the stand. Because of these apprehensions, hunters may not feel free to take proper aim and, accordingly, may not be able to make the best shot at their quarry.

To minimize the possibility of accident, it has been common practice to utilize devices to ensure that the hunter stays with the stand. While a number of various devices have been used for such purpose, they have generally been unacceptable for a variety of reasons.

For example, it is advantageous for the device to be noiseless when used by a hunter waiting for game. Use of material or devices which create a considerable level of noise will hamper the efforts of the user to attract game. As will be appreciated by those skilled in the art, game, such as deer, are frightened by the slightest noise. Although it has long been known that use of safety restraint or belt devices by hunters is beneficial, it has generally been considered a hinderance or impractical to use a devise which makes noise.

In particular, many of the devices of the prior art known as climbing tree stands utilize a variety of adjustable metal gripping elements which adjust to the diameter of the tree trunk. However, these gripping elements make a great deal of mechanical noise in operation.

Further, many hunters have used devices to restrain themselves within a tree stand or other device and have found that it is difficult and sometimes impossible to quickly release the restraining device. This lack of a quick release presents a safety hazard. There are times when the user needs to quickly release himself or herself from the device which is hindered if the user is unable to find a release means, the release does not work as expected, or if the device does not include a quick release means. In particular, safety belts which attach to the tree and to the hunter present the danger of strangulation if the hunter should fall out of the stand.

In addition, many safety belt devices do not allow the freedom of movement to a user necessary to comfortably turn and move while restrained by the devices.

Climbing tree stands are also complex to assemble and use and are subject to breakdown because they are constructed of many moving mechanical parts. If a connection or joint should fail while in use, the stand may open, allowing the hunter to fall. Furthermore, the upper frame used in climbing tree stands such as the Amacker stand (U.S. Pat. No. 4,331,216) and the like must slide along the trunk of the tree as the hunter climbs the tree. Such frames do not provide sturdy, safe support of the torso because they may slide down the tree if the hunter is not sitting on the frame.

In addition, once the desired elevation has been attained and the stand is in use, the prior art devices typically require the user to sit on a seat or stand on a platform with very little lateral support. In this position, the user has side support only from the tree or pole. However, the supporting frame is often so wide and is spaced so far from the tree or pole that the user would have difficulty bracing himself simultaneously from more than one direction, for example, while attempting to take aim with a rifle. In other prior art, the devices require the hunter to attempt to shoot while standing, sometimes in a direction past the supporting tree. Thus these devices place the hunter in an unstable and extremely dangerous position because of the rifle recoil.

In many prior art devices, spikes which penetrate the tree are used to attach the device to the tree. However, because of potential damage to the tree, many jurisdictions now prohibit the use of spikes. Furthermore, such devices are not easily removable from the tree.

There is a need for a device which supports a user in a tree stand and prevents the user from inadvertently falling out of the stand while changing position and firing his weapon. The device must be simple, sturdy, easy to attach to the tree or pole, and noise-free in operation. The device must allow the hunter to assume a variety of positions safely without hindering his movements. The device must be attachable to the tree either with spikes or without spikes.

SUMMARY OF THE INVENTION

A tree stand torso bar is attachable to a tree or post to support the torso of a hunter in a tree stand and prevent the hunter from accidentally falling out of the stand. The invention comprises a sturdy oval metal frame with vertical supports which engage the trunk of the tree, a lower cross-bar connecting the vertical supports, lower inclining struts which provide additional strength, and an adjustable strap which may be tightened by a ratchet mechanism to hold the device to the tree trunk or pole. The frame, supports, cross-bar, and struts are of integral, unitary construction. The device may be screwed into the tree by threaded stakes directed through apertures in the vertical supports. Alternatively, a second strap may be used in place of the threaded stakes.

A principle object and advantage of the invention is that the frame, supports, cross-bar, and struts are of integral, unitary construction without joints or moving parts. The device is thus simple and very sturdy and is not subject to mechanical failure, which could cause a hunter to fall out of the stand.

A second object and advantage of the invention is that it attaches to a tree trunk or pole with very little mechanical noise, thus avoiding frightening game.

Another object and advantage of the invention is that it attaches firmly and securely to the tree trunk or pole without any damage to the tree or pole.

Another object and advantage of the invention is that it is easily removable from the tree trunk or pole when no longer needed.

Another object and advantage of the invention is that it provides complete freedom of movement to the hunter because the hunter is not in any way attached to the device.

Another object and advantage of the invention is that, without being attached to the hunter, it prevents the hunter from falling out of the tree stand, thus avoiding potential strangulation problems present in safety belt devices.

Another object and advantage of the invention is that it may be tightened while in place on the tree without loosening the tree-engaging element, thus providing security to the hunter during adjustment.

Another object and advantage of the invention is that the tree stand torso bar attaches to the tree separately from the stand, making the torso bar usable with all makes and models of tree stands.

Another object and advantage of the invention is that since the torso bar attaches separately to the tree and not the stand, the torso bar and the hunter will not fall with the stand, if the stand breaks, comes loose or falls from the tree.

Another object and advantage of the invention is that the hunter doesn't have to purchase a new tree stand; the torso bar can be used with any presently owned stand or stands.

Another object and advantage of the invention is that the torso bar is designed to let the hunter lean against it four support to shoot in high wind conditions.

Another object and advantage of the invention is that the torso bar is designed to allow the hunter to lean against it while standing or sitting, thus being able to rest while spending hours in a tree stand.

Another object and advantage of the invention is that the hunter can't step off the tree stand and fall, because the torso bar hugs the hunter's body.

Another object and advantage of the invention is that the hunter will feel secure because the bar hugs his torso. A safety belt doesn't offer this sense of security.

Another object and advantage of the invention is that the torso bar can be made of steel, stainless steel or aluminum from round or square material.

DETAILED DESCRIPTION OF THE PREFERRED EMBODIMENTS

Figure 1:
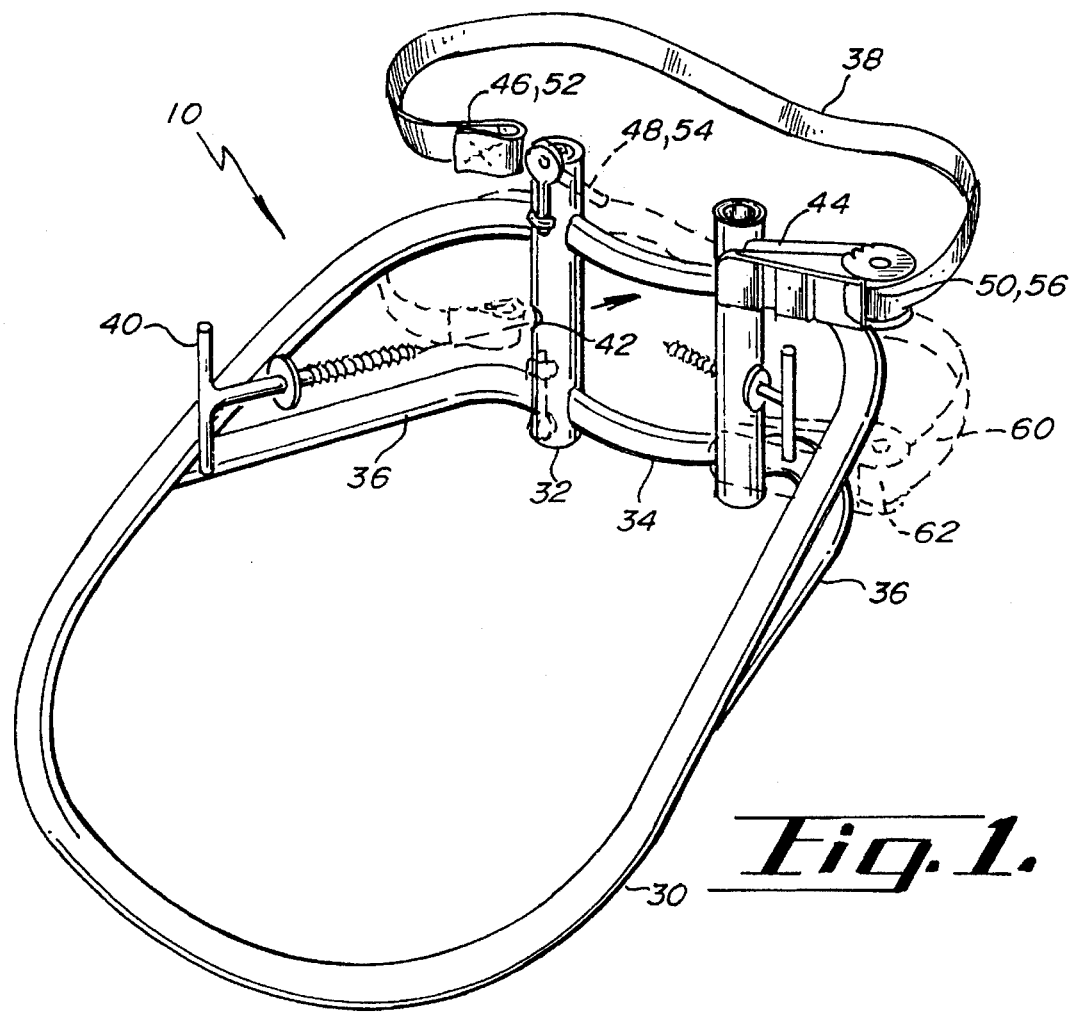
FIG. 1 is a perspective view of the tree stand torso bar with an optional second strap shown in phantom.

The tree stand torso bar of the present invention is designated in the Figures by reference numeral 10.

Figure 3:
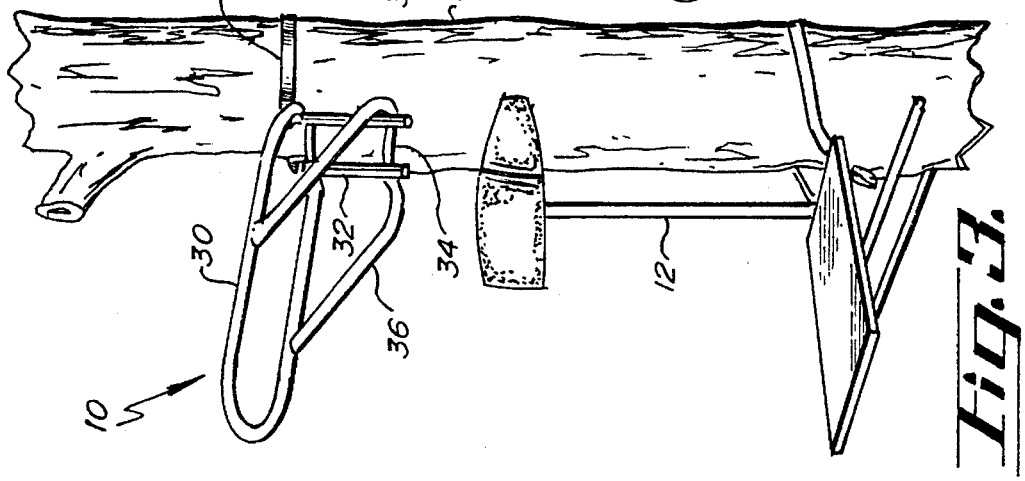
FIG. 3 is a perspective view of the tree stand torso bar attached to a tree in relation to a tree stand.

As can best be seen in FIG. 3, the tree stand torso bar 10 is designed to be used with an existing tree stand 12 which is attached to a tree or pole 14. The tree stand torso bar 10 attaches to the tree or pole 14 above the tree stand 12.

Figure 4:
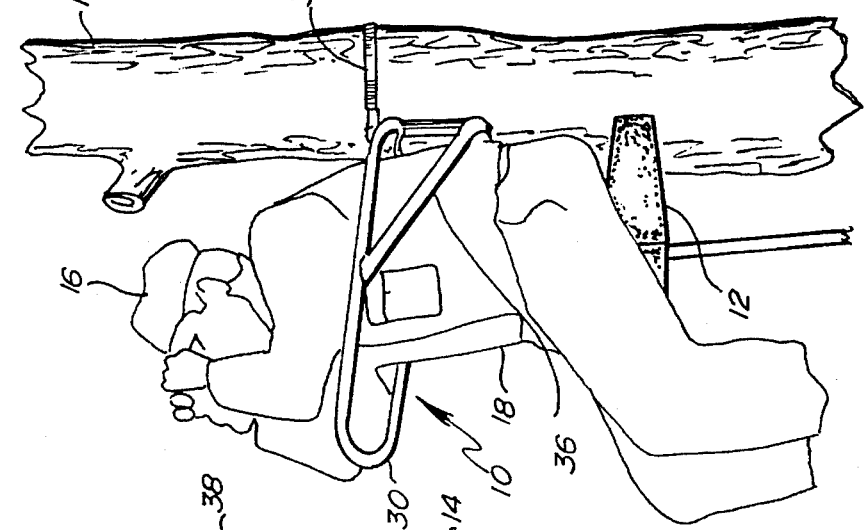
FIG. 4 shows the use of the tree stand torso bar by a hunter sitting on a tree stand.

FIG. 4 shows the tree stand torso bar 10 in use by a hunter 16 who is sitting on a tree stand 12. As can be seen, the tree stand torso bar 10 surrounds the upper torso 18 of the hunter 16 and prevents the hunter from accidentally falling out of the tree stand 12.

Figure 5:
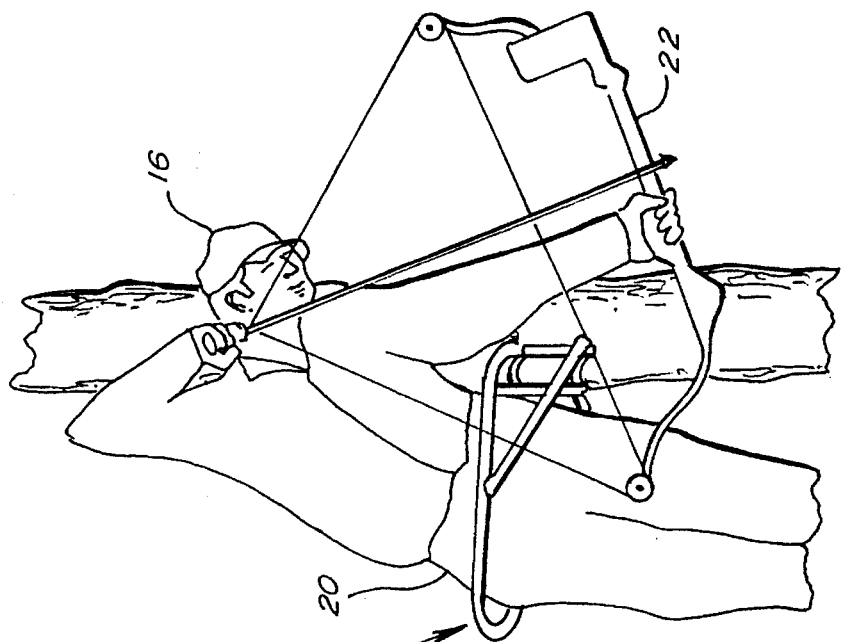
FIG. 5 shows the use of the tree stand torso bar by a hunter standing on a tree stand.

FIG. 5 shows the tree stand torso bar 10 in use by a hunter 16 who is standing on a tree stand 12 (not shown). As can be seen, the tree stand torso bar 10 surrounds the lower torso 20 of the hunter 16 and prevents the hunter from accidentally falling out of the tree stand.

As will be apparent from the figures, the tree stand torso bar 10 does not attach at any point to the hunter 16. The lack of any attachment provides the hunter 16 with complete freedom of movement, thus allowing the hunter 16 to easily aim a weapon 22 at game from any position.

Furthermore, the lack of attachment of the hunter 16 to the torso bar 10 prevents potential strangulation which might result if the hunter were to fall out of the tree stand.

As best shown in FIG. 1, the tree stand torso bar 10 comprises a substantially horizontal frame 30 surrounding the hunter 16, vertical supports 32 connected to the frame 30 and engaging a tree trunk or pole 14, a lower cross-bar 34 connecting the vertical supports 32 together, inclined struts 36 connected to the frame 30 and to the vertical supports 32, and a flexible strap 38 for attaching the torso bar 10 to a tree trunk or pole 14, the strap 38 being adjustable for tree trunks of varying thickness.

The frame 30, vertical supports 32, cross-bar 34, and struts 36 are of integral, unitary construction as by being manufactured as a single piece or welded together or the equivalent. There are no joints or moving parts. The torso bar 10 is thus simple and very sturdy and is not subject to mechanical failure which could cause a hunter to fall out of the tree stand.

It will be apparent to those of ordinary skill in the art that the strap 38 attaches to the tree trunk or pole 14 with very little mechanical noise, as the strap is flexible and non-metallic. The lack of mechanical noise is advantageous to avoid frightening game.

The strap 38 also allows attachment of the torso bar 10 the tree trunk without damaging the tree, because the strap 38 is soft and flexible and contains no sharp edges. This is important in jurisdictions which prohibit the use of spikes or stakes which might damage a tree.

The strap 38 also allows the torso bar 10 to be easily removed from the tree trunk or pole 14, as there is no hardware that penetrates the tree trunk or pole 14.

The torso bar 10 is preferably made of metal, preferably steel, and is preferably of tubular construction to minimize weight. Advantageously, the torso bar 10 may be oval in shape so that the torso bar 10 closely conforms to the hunter's torso without unduly constricting him.

Optionally, threaded metal stakes 40 may be inserted through apertures 42 in the vertical supports 32 to screw into the tree trunk or pole 14 and provide additional support.

In the preferred embodiment the strap 38 comprises a first end 44 and a second end 46, the first end 44 being connected to the torso bar 10. The strap further comprises a means 48 for removably attaching the second end 46 to the torso bar 10 after the strap 38 is passed around the tree trunk or pole 14. The strap also includes a means 50 for adjusting the length of the strap 38 to accommodate trees of varying trunk diameters and to securely attach the torso bar 10 to the tree trunk or pole 14.

Figure 2:
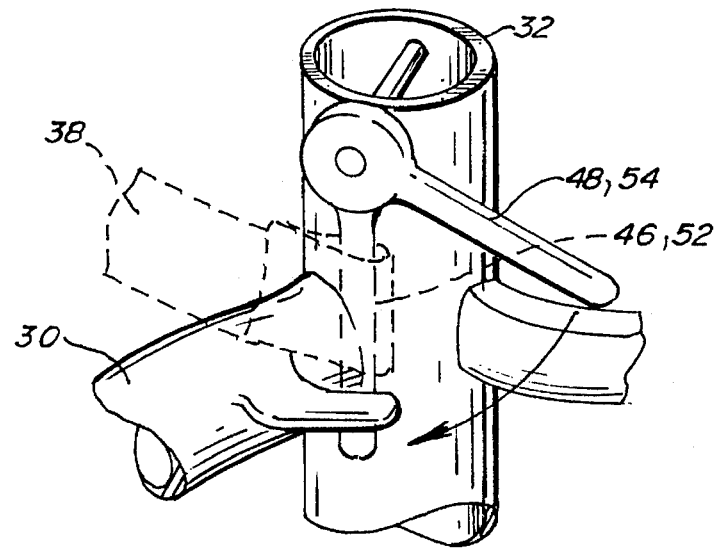
FIG. 2 is a detailed view of the means for attaching the second end of the strap to the torso bar, broken away.

In the preferred embodiment the second end 46 forms a loop 52 and the means 48 for removably attaching the second end 46 to the torso bar 10 comprises a movable pin 54. To attach the second end 46 to the torso bar 10, the movable pin 54 is rotated to the position shown in FIG. 2 and is passed through the loop 52. The movable pin 54 is then rotated to the position shown in phantom in FIG. 2 and will be held against further rotation as the strap 38 is tightened.

In the preferred embodiment the means 50 for adjusting the length of the strap 38 comprises a ratchet 56. The ratchet 56 operates to maintain tension on the strap 38 as the strap 38 is tightened.

It will be seen that the preferred embodiment thus allows the strap 38 to be tightened around the tree trunk or pole 14 without loosening the strap 38. This is advantageous in that there is no danger that the torso bar 10 may come loose from the tree trunk or pole 14 as the strap 38 is tightened.

The torso bar 10 may optionally comprise a second strap 60 similar to the strap 38, attached to the lower portion of the vertical struts 32 as shown in phantom in FIG. 1. The second strap provides additional support and is advantageous when use of the stakes 40 is not allowed. Preferably, the length of the second strap 60 is adjustable by a ratchet 62.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A tree stand torso bar to support the torso of a hunter in a tree stand attached to a tree trunk or pole and prevent the hunter from accidentally falling off the stand, comprising:

a substantially horizontal frame for surrounding the hunter, vertical supports, connected to the frame for engaging a tree trunk or pole, a lower cross-bar connecting the vertical supports together, inclined struts, connected to the frame and to the vertical supports, and a flexible strap for attaching the torso bar to the tree trunk or pole, said strap being adjustable for tree trunks of varying thickness, said frame, said supports, said cross-bar, and said struts being of integral, unitary construction.

2. The torso bar of claim 1, wherein the strap comprises a first end and a second end, the first end being connected to the torso bar, means for removably attaching the second end of the strap to the torso bar, and means for adjusting the length of the strap to accommodate trees with varying trunk diameters and to securely attach the torso bar to a tree trunk or pole.

3. The torso bar of claim 2, wherein the second end of the strap forms a loop and wherein the means for attaching the second end to the torso bar comprises a movable pin which engages the loop.

4. The torso bar of claim 2, wherein the means for adjusting the length of the strap comprises a ratchet.

5. The torso, bar of claim 1, wherein the frame and struts are made of metal and are of tubular construction.

6. The torso bar of claim 5, wherein the metal is steel.

7. The torso bar of claim 1, wherein the frame is oval in shape.

8. The torso bar of claim 1, wherein the vertical supports have apertures and further comprising threaded metal stakes which screw into the tree trunk or pole through the apertures.

9. The torso bar of claim 1, further comprising a second strap for attaching the torso bar to the tree or pole.

10. The torso bar of claim 9, wherein the length of the second strap is adjustable and comprising a ratchet for adjusting the length of the second strap.

11. A tree stand torso bar to support the torso of a hunter in a tree stand attached to a tree trunk or pole and prevent the hunter from accidentally falling off the stand, comprising:

a substantially horizontal frame for surrounding the hunter, vertical supports, connected to the frame, for engaging a tree trunk or pole, a lower cross-bar connecting the vertical supports together, inclined struts, connected to the frame and to the vertical supports, a flexible strap having a first end and a second end, the first end being connected to the torso bar, means for removably attaching the second end of the strap to the torso bar, and means for adjusting the length of the strap to accommodate trees with varying trunk diameters and to securely attach the torso bar to the tree trunk or pole, said frame, said supports, said cross-bar, and said struts being of integral, unitary construction.

12. The torso bar of claim 11, wherein the frame and struts are made of metal and are of tubular construction.

13. The torso bar of claim 12, wherein the metal is steel.

14. The torso bar of claim 11, wherein the frame is oval in shape.

15. The torso bar of claim 11, wherein the second end of the strap forms a loop and wherein the means for attaching the second end to the torso bar comprises a movable pin which engages the loop.

16. The torso bar of claim 11, wherein the means for adjusting the length of the strap comprises a ratchet.

17. The torso bar of claim 11, wherein the vertical supports have apertures and further comprising threaded metal stakes which screw into the tree trunk or pole through the apertures.

18. The torso bar of claim 11, further comprising a second strap for attaching the torso bar to the tree or pole.

19. The torso bar of claim 18, wherein the length of the second strap is adjustable and comprising a ratchet for adjusting the length of the second strap.

20. A tree stand torso bar to support the torso of a hunter in a tree stand attached to a tree trunk or pole and prevent the hunter from accidentally falling off the stand, comprising:

a substantially horizontal frame for surrounding the hunter, vertical supports, connected to the frame, for engaging a tree trunk or pole, a lower cross-bar connecting the vertical supports together, inclined struts, connected to the frame and to the vertical supports, a flexible strap having a first end and a second end, the first end being connected to the torso bar, the second end forming a loop and the torso bar having a movable pin which engages the loop, the second end thereby being removably attachable to the torso bar, and a ratchet for adjusting the length of the strap to accommodate trees with varying trunk diameters and to securely attach the torso bar to the tree trunk or pole, said frame, said supports, said cross-bar, and said struts being of integral, unitary construction.

* * * * *